Feb. 11, 1969  D. F. MURPHY  3,426,534
FUEL CONTROL DEVICE
Filed June 2, 1966  Sheet 3 of 3

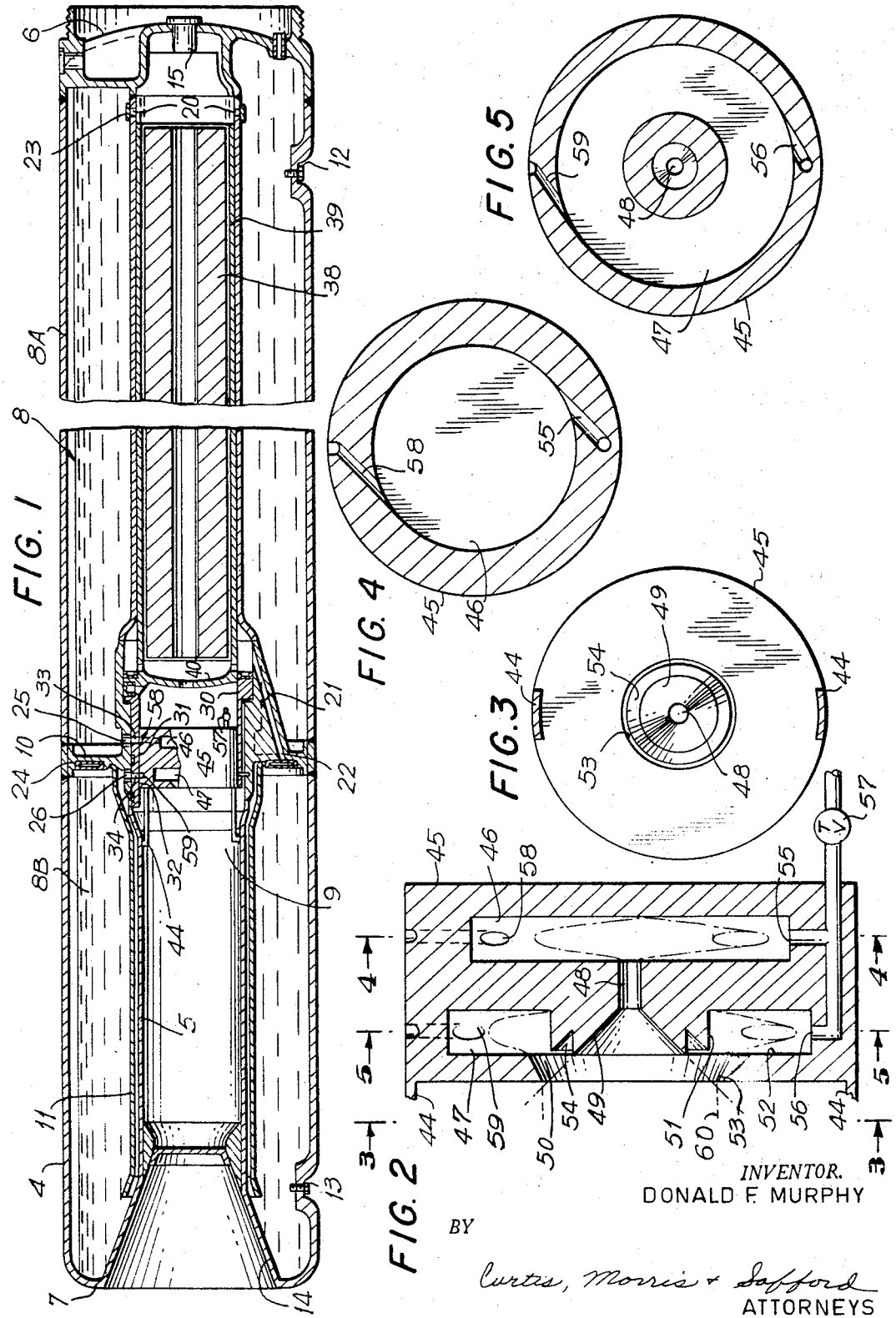

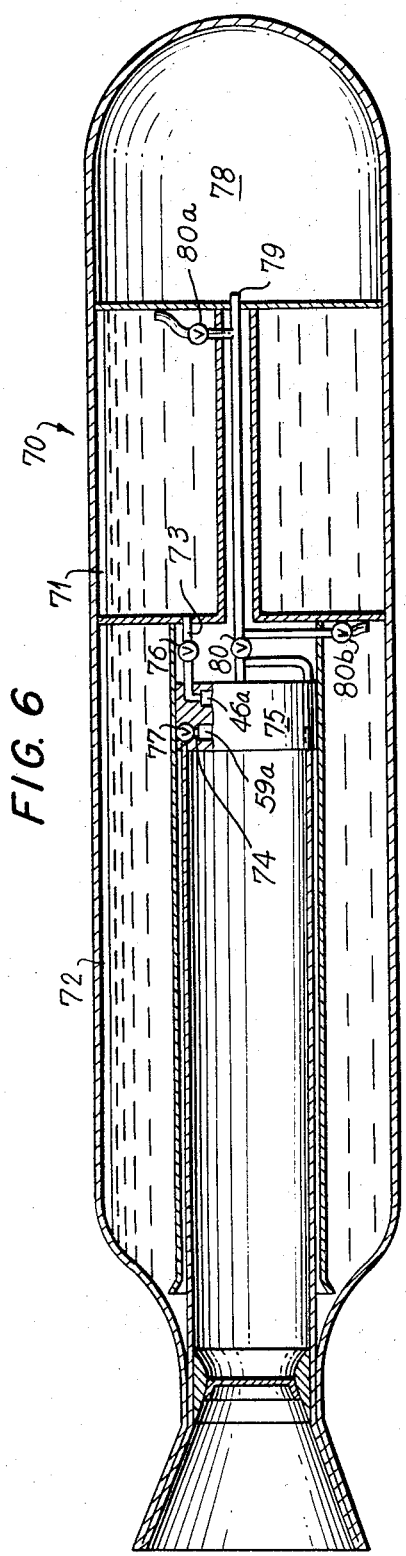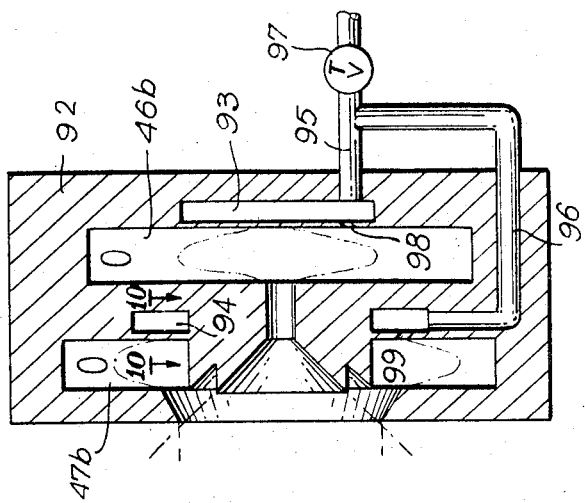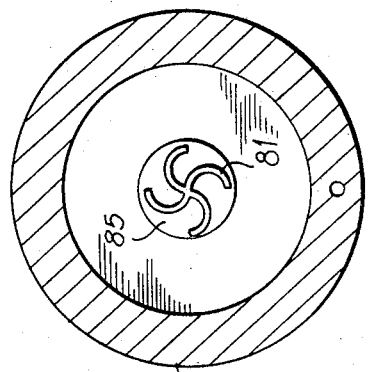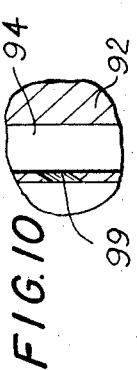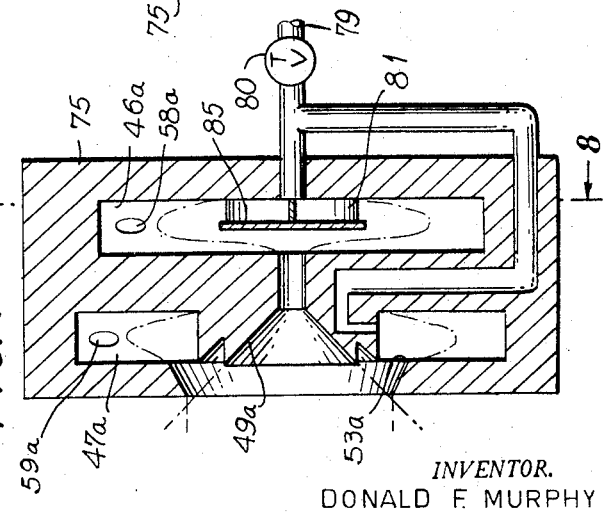

INVENTOR.
DONALD F. MURPHY
BY Curtis, Morris & Safford
ATTORNEYS

United States Patent Office 3,426,534
Patented Feb. 11, 1969

3,426,534
FUEL CONTROL DEVICE
Donald F. Murphy, Hackettstown, N.J., assignor to Thiokol Chemical Corporation, Bristol, Pa., a corporation of Delaware
Filed June 2, 1966, Ser. No. 554,814
U.S. Cl. 60—258    14 Claims
Int. Cl. F02k 9/02; F02g 1/00; B05b 7/10

ABSTRACT OF THE DISCLOSURE

A method of and apparatus therefor of controlling the delivery of a fluid with the aid of a circular chamber having an axial outlet opening at one side by supplying fluid to the chamber, supplying a second lower specific gravity fluid to the chamber to import rotative force and energy to the first fluid therein, and varying the rate of flow of said second fluid to control the rate at which the first fluid escapes from said opening.

---

The present invention relates to a method of and apparatus for delivering liquid at a controlled rate and more particularly to injecting liquid fuel and/or oxidizer into the combustion chamber of a rocket engine.

One of the objects of the present invention is to provide a method of and apparatus for controlling flow and the rate of flow of a fluid by rotating it in a circular chamber to vary the sum of the static and centrifugal forces acting on the fluid and thereby its rate of discharge from an axial outlet opening.

Another object is to provide an improved method of and apparatus for modulating the rate of flow of a liquid fuel injected into a combustion chamber in a thin sheet or mist by inversely varying the quantity of a second high velocity fluid injected into the liquid and the energy transferred thereto.

Another object is to provide an improved method of and apparatus for controlling the quantity of liquid fuel and oxidizer delivered to the combustion chamber of a rocket engine in intersecting paths.

Still another object is to provide an apparatus for injecting a plurality of liquids into the combustion chamber of a rocket engine at controlled rates which apparatus is of simple and compact construction, economical to manufacture and one which is reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a sectional view of a packaged fuel type rocket engine with an injector incorporating the novel features of the present invention shown applied thereto;

FIGURE 2 is an enlarged sectional view of the injector device in side elevation and showing the circular chambers from which the liquid fuel and oxidizer are injected into the combustion chamber in intersecting paths;

FIGURE 3 is an end view of the injector device as viewed from line 3—3 of FIGURE 2 and showing the relationship of the coaxial outlet discharge openings from the respective chambers;

FIGURE 4 is a sectional view taken on line 4—4 of FIGURE 2 to show the circular contour of the inner chamber and inlet ports for liquid and gas arranged tangentially at the periphery of the chamber;

FIGURE 5 is a sectional view taken on line 5—5 of FIGURE 2 to show the circular shape of the outer chamber and the tangential inlet ports for liquid and gas;

FIGURE 6 is a sectional view of a rocket engine having a different arrangement of tanks and controls for supplying gas and liquid to the injector device;

FIGURE 7 is a side elevational view of an injector device of modified construction to which the gas may be supplied axially;

FIGURE 8 is a sectional view taken on line 8—8 of FIGURE 7 to show the spiral vanes for directing the gas in a circular path;

FIGURE 9 is a sectional view similar to FIGURES 2 and 7 showing an injector device of a still further modified construction;

FIGURE 10 is a sectional view taken on line 10—10 of FIGURE 9 to show the tangential gas injector port;

Figure 11:
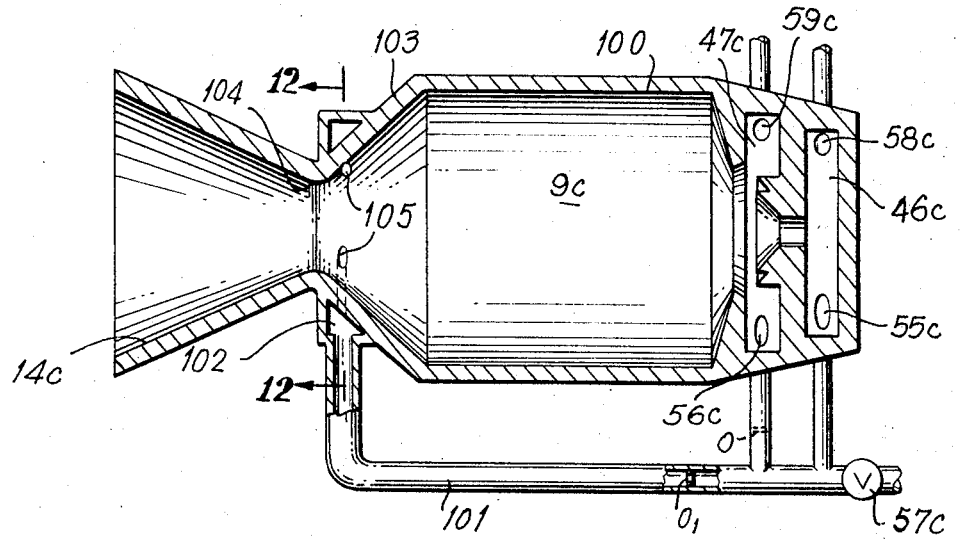
FIGURE 11 is a diagrammatic view of a rocket engine combustion chamber similar to FIGURE 1 and showing an arrangement for maintaining a substantially constant back pressure on the injector of the present invention.

The method of the present invention controls the delivery of a liquid with the aid of a circular control chamber having an axial outlet at one side which comprises the steps of supplying two fluids having different specific gravities to said chamber. One of the fluids, such as a liquid fuel, may be supplied at a particular rate depending upon its pressure and the size of an orifice through which it flows into the chamber; and the other fluid, such as a gas, is injected into the heavier liquid at a high energy level in a direction to cause rotation of the latter. For example, the gas may be supplied at a high velocity and pressure in a direction tangential to the axis of the chamber and thereby transfer its energy to the liquid to cause it to rotate. Rotation of the liquid is utilized to produce a centrifugal force tending to hold it at the outer periphery of the chamber. Both the gas and liquid can escape through the axial outlet opening with the gas of a minimum specific gravity and maximum volume escaping at the axis of the opening and the heavier liquid escaping in an annular sheet around the core of gas. The flow of gas radially inward toward the axial outlet opening and relative to the annular mass of liquid, as well as the frictional drag produced on the liquid by the wall of the chamber, produces a drag force on the liquid tending to produce a gas-liquid interface shaped as shown in FIGURE 2. The normal pressure differential between the liquid inlet and combustion chamber tends to produce a flow from the axial outlet opening. However, these pressure forces tending to discharge the liquid from chamber are opposed by the centrifugal force acting on the liquid in combination with the static pressure of the gas.

The amount of liquid delivered from the chamber varies with the opposing forces acting thereon and is controlled by varying the supply of gas and thereby the amount of energy transferred to the liquid. When the gas is supplied at a maximum rate it transfers sufficient energy and rotates the liquid at a velocity to produce a centrifugal force which, together with static pressure from the gas acting on the liquid, will present any discharge from the chamber. When the gas is supplied at a minimum rate the liquid fuel will be delivered from the chamber at a maximum rate designed for the particular condition. Thus, in accordance with the present invention the rate at which liquid is delivered from the chamber is modulated by varying the amount of gas supplied to the chamber in an inverse ratio.

When the method of the present invention is applied to a rocket engine, the liquid fuel and oxidizer are supplied to two coaxial chambers, respectively, and gas is supplied to the chambers to rotate the liquid therein as described above. Gas may be supplied at the same controlled rate to both chambers, or the rate may be varied in the respective chambers to vary the ratio of oxidizer to fuel supplied to the combustion chamber. In either case, the gas is supplied to each chamber at a rate to control the rate of discharge of liquid from its outlet opening. The liquid will be discharged from each of the chambers in a thin sheet at the periphery of the outlet port and preferably the outlet ports for the separate liquids are so shaped as to direct the sheets of separate liquid into intersecting paths.

Also, when the method of the present invention is applied to a rocket engine, variations in the amount of fuel supplied to the combustion chamber varies the mass flow rate and pressure in the chamber. Thus, an increase in pressure in the combustion chamber then requires a corresponding change in the pressure acting on the fuel to supply the same quantity to the injector as well as a corresponding change in the amount of the gas supplied to the injector to maintain the same flow rate of fuel from the injector. The method of the present invention may include the additional step of maintaining a constant pressure in the combustion chamber by injecting a fluid into the nozzle of the engine upstream from the throat to produce a non-structural throat in the structural throat of the nozzle of varying area which varies the mass flow rate and thrust. Also, the fluid is injected in a novel way tangentially of the structural throat to produce a vortex forming the non-structural throat as distinguished from injecting fluid into the jet stream in a direction perpendicular to its axis.

FIGURE 1 of the drawings illustrates a rocket motor of the type described and claimed in the U.S. Letters Patent to A. Sherman et al. No. 3,094,837 issued June 25, 1963 to which an injector of the present invention is shown applied as one embodiment of the present invention. This rocket motor comprises a casing having an outer peripheral wall 4 and an inner peripheral wall 5 connected between headers 6 and 7 at the forward and aft ends to define an annular space 8 therebetween and an axial combustion chamber 9 within the inner wall. A bulkhead 10 extends between the outer wall 4 and the inner wall 5, intermediate the ends thereof, to divide the annular space 8 into a forward tank section 8–A for liquid oxidizer and an aft tank section 8–B for liquid fuel. Tubular baffles 11 closely surround the inner wall 5 between the combustion chamber 9 and aft tank section 8–B and extend from the bulkhead 10 rearwardly to the aft header 7. When the tank section 8–B is pressurized, liquid propellant fuel flows through the passages or baffles 11 to cool the wall of the combustion chamber 9.

Suitable liquid propellants are inhibited red fuming nitric acid (IRFNA) containing approximately 18–23% $NO_2$ as the oxidizer in the tank section 8–A and unsymmetrical dimethyl hydrazine (UDMH) as liquid fuel in tank section 8–B, respectively. The tank sections 8–A and 8–B are provided with filler openings 12 and 13, respectively, which are hermetically sealed after the tank sections are filled. An exit cone or nozzle 14 is provided at the outlet end of the combustion chamber 9 and an igniter 15 closes the forward end of the combustion chamber.

The inner tank wall 5 has a plurality of circumferentially spaced orifices 20 adjacent the forward end of the tank section 8–A for pressurizing the tank section, while bulkhead 10 has a plurality of passages 21 terminating in pressurizing orifices 22 at the forward end of tank section 8–B for pressurizing that tank section. Orifices 20 and 22 are sealed by burst bands 23 and 24 which are designed to withstand handling loads. The intermediate section of the inner wall 5 having bulkhead 10 also is provided with injection orifices 25 and 26 between the combustion chamber 9 and tank sections 8–A and 8–B, respectively. A slide valve 30 has lands 31 and 32 which overlie the injection orifices 25 and 26 during storage and orifices 33 and 34 which align with the injection orifices 25 and 26 when the slide valve 30 is moved to its firing position. For purposes of description, the slide valve 30 is shown in its actuated position to align the orifices 25 and 26 with the orifices 33 and 34, but it will be understood that the slide normally maintains the tanks 8–A and 8–B sealed.

During storage and handling, the liquid propellant tank sections 8–A and 8–B are sealed by shearing cups seated in the orifices 25 and 26 and extending into holes in the lands 31 and 32 of slide valve 30. The cups are sheared when the slide valve 30 is moved from its inoperative storage position to its operative firing position shown in FIGURE 1.

A solid fuel gas generator is mounted in the forward end of the combustion chamber 9. The gas generator comprises an annular stick of the solid combustible material 38 mounted in a holder 39 having a metal sleeve with a perforated flow restricting disk 40 at its rearward end. The gas generator is slid into position in the combustion chamber 9 and latched to the forward end of slide 30 by spring pressed dogs, not shown. The holder 39 and disk 40 act as a piston operated by the gas produced by burning the stick of solid fuel 38 to actuate the slide 30 to the position shown in FIGURE 1. Also, the ends of the pressurizing passages 21 terminate adjacent the perforated disk 40 so as to deliver gaseous products of combustions from the gas generating material 38 at a pressure to burst the band 24 and enter the forward end of the tank section 8–B. Gaseous products of combustion from the open end of the holder 39 also burst the band 23 and enter the forward end of tank section 8–A through the ports 20. As thus far described, the invention is substantially identical with that illustrated and described in the Sherman et al. patent, referred to above.

In accordance with the present invention, a novel injector device 45 is provided for practicing the method of the present invention. The injector device 45 comprises at least one circular chamber 46 to which a fluid, such as a liquid fuel, is supplied. A connection is also provided for supplying a second fluid such as gas, to the chamber in a direction to rotate the liquid in the chamber. In the illustrated embodiment, the injector device 45 is shown applied to a rocket engine and has a plurality of circular chambers 46 and 47 to control the delivery of both liquid fuel and oxidizer to a combustion chamber. Thus the description of the device 45 will be directed to a multiple chambered construction for controlling a plurality of liquids, but it will be understood that the device can be designed to control the flow of a single fluid.

As shown in FIGURE 1, the injector device 45 is mounted on the inner wall 5 of the combustion chamber 9 in fixed relation to and at the interior of the slide 30 as shown in FIGURE 1 by means of straps 44 welded to the wall 5. As shown more clearly in FIGURE 2, the injector device 45 has the pair of liquid receiving chambers 46 and 47 arranged coaxially in spaced relation along the body of the device. Chamber 46 has an axial outlet opening 48 at one side of a cylindrical shape adjacent the chamber which expands into a conical diffusing surface 49 at the rear. The chamber 47, also of circular shape, has an annular outlet opening 50, see FIGURES 2 and 3, coaxial with the outlet opening 48 and located radially outward therefrom. The walls 51 and 52 of the chamber 47 are so shaped as to form the outlet opening 50 and the wall 51 provides a lip 53 from which liquid may escape in a cylindrical curtain or sheet. It will be further observed that the rearwardly inclined surface from lip 53 is spaced radially from the conical surface 49 and is recessed at 54 to space the lip 53 forwardly of the end of the conical surface 49 for producing a sheet of liquid in a circular pattern.

As shown in FIGURE 2, the chambers 46 and 47 have tangential inlet ports 58 and 59, respectively, projecting radially at the outer periphery of the injection device 45 for alignment with the ports 33 and 34 in the slide 30 when the latter has been actuated to operative position. Thus, when the slide 30 is in the position illustrated in FIGURE 1, oxidizer and fuel are being supplied to the chambers 46 and 47 at a particular rate depending upon the pressure on the liquid and the area of the orifices through which it flows. To this end, the passages 20 and 21 from the solid fuel 38 in the gas generator to the tanks 8–A and 8–B as well as the orifices 25 and 26 may be designed to supply the liquid fuel and oxidizer at a particular rate and subjecting the liquids in the tanks to a pressure less than the pressure in the chamber.

On the other hand, gas is supplied from the gas generator to the chambers 46 and 47 through inlet ports 55 and 56, respectively, at a variable rate as controlled by a throttle valve 57. Throttle valve 57 may be of any suitable construction for regulating the rate of flow therethrough. Thus, in the illustrated embodiment, the same amount of gas is supplied to both chambers 46 and 47, and thereby the energy contained in the gas supplied, to control the delivery of fuel and oxidizer to the combustion chamber 9 at a particular rate. As stated above, additional valves may be used for varying the amount of gas supplied to the separate chambers 46 and 47 to vary the relative rate of flow of fuel and oxidizer. As shown in FIGURES 4 and 5, the inlet ports 55 and 56 to the chambers 46 and 47 are arranged tangentially at the outer periphery of the chamber so that the liquid and gas supplied thereto rotate therein. One form of injector having now been described in detail, the mode of operation is explained as follows.

For purposes of description, let it be assumed that the igniter 15 has been initiated to ignite the solid fuel 38 which burns and produces a gas at relatively high pressure; and that the gas pressure has actuated the slide 30 to shear the sealing cups and open the orifices 25 and 26 in the inner wall 5 of the tanks 8–A and 8–B as shown in FIGURE 1. These orifices 25 and 26 are then aligned with the inlet ports 58 and 59 in the injector device 45 through orifices 33 and 34 in the slide 30. Liquid oxidizer and fuel flows into the chambers 46 and 47, respectively, at a predetermined rate as determined by the size of the orifices 25 and 26 and the pressure applied to the liquid in the tanks 8–A and 8–B. Simultaneously, gas at high pressure is supplied through the valve 57 into the chambers 46 and 47 of the injector device 45 as shown in FIGURES 4 and 5.

The liquid and gas enter the chambers 46 and 47 tangentially to rotate the liquid in the circular chambers. Rotation of the liquid and oxidizer in the circular chambers 46 and 47 produces a centrifugal force tending to force them radially to the outer peripheries of the chambers while at the same time the flow of separated gas moving toward the axial outlet openings 48 and 50 produces a drag force on the liquid tending to move a sheet of the liquid toward the axis. Thus, when the pressure applied to the annulus of liquid tending to force it inwardly toward the axis is greater than the static pressure and centrifugal force opposing such force, the liquid will escape in an annulus around the core of escaping gas. Such liquid oxidizer escaping from the chamber 46 will be advanced by the flowing gas along the cylindrical throat at the axis of the outlet opening 48 and then follow the conical surface 49 and be discharged in a conical sheet into the combustion chamber 9. Liquid fuel in the chamber 47 at the inner periphery of the lip 53 will be discharged into the combustion chamber 9 in a cylindrical or conical sheet, the discharge angle depending upon the flow rate. As will be observed in FIGURE 2, the paths of the oxidizer and fuel liquid sheets will intersect and impinge on the circular line 60, and the liquids being hypergolic are ignited and burn in the combustion chamber. On the other hand, if the static and centrifugal pressure heads acting on the liquid at the inner edge of the inlet ports 58 and 59 is greater than the opposing pressure tending to discharge the liquid, no liquid will escape from the chambers.

Valve 57 is adjustable to vary the rate at which gas is supplied to the chambers 46 and 47 and thereby control the energy transferred to the liquids, the centrifugal force on the liquids, the back pressure on the liquids, and the rate at which the liquids escape from its chamber 46 or 47. Thus, by decreasing the rate of flow of gas to the chambers 46 and 47, the rate of discharge of liquids from the chambers will increase to vary the discharge of liquids in inverse relationship to the amount of gas supplied to the chambers. It will be understood that valve 57 would be operable to adjust the rate at which gas is supplied to the chambers 46 and 47 and the resulting rate of flow of liquids from the chambers, between the maximum and minimum rates.

FIGURE 6 illustrates a rocket engine 70 of modified construction having tanks 71 and 72 to which oxidizer and fuel are supplied, but instead of having a slide 30 the liquids are supplied through lines 73 and 74 to the injector device 75 and the flow is controlled by adjustable valves 76 and 77. Similarly the high pressure gas supplied to the injector device 75 is contained in a separate tank 78 and flows through a supply line 79 controlled by a valve or valves 80. Thus, the rate of supply of oxidizer and fuel is controlled by adjustable valves 76 and 77 and the rate of supply of gas is controlled by the valves 80, 80a and 80b as shown in FIGURE 6.

The injector device 75 also is of a construction so as to supply liquid tangentially to the outer periphery of circular chambers 46a and 47a, but the gas is supplied at the inner peripheries thereof and directed to assist the circular motion of liquid in the chambers. Chambers 46a and 47a and the conical surface 49a and lip 53a are substantially identical with the construction illustrated in FIGURE 2. The inlet ports 58a and 59a for oxidizer and fuel extend parallel to the axis and then radially inward into the chambers the same as in the injector device 45 illustrated in FIGURE 2. The gas inlet 79 for the chamber 46a, however, is located axially of the device and discharges into radially extending curve blades 81 shown in FIGURES 7 and 8. One side of the curved blades 81 are closed by a plate 85 so that gas entering the blades must discharge radially and be given swirling motion in the circular chamber 46a. Gas supplied to the inner peripheral edge of chamber 47a flows into an annular space in a direction to assist the rotation of the liquid in the chamber.

The injector device 75 is initiated by opening the valves 76 and 77 to supply liquid oxidizer and fuel to the chambers 46a and 47a, the same as in the injector device 45, and valves 80 are opened to supply gas to the inner periphery of the chambers 46a and 47a in a circular path to transfer its energy to the liquid and thereby increase the centrifugal force acting on the liquid. The rate of discharge of oxidizer and liquid fuel from the device 75 is controlled by adjusting the valves 80 and thereby the forces acting on the liquid as it rotates in its respective chamber.

FIGURE 9 illustrates an injector device 92 of still further modified construction. Injector device 92 is similar to the device 45 illustrated in FIGURE 2, with chambers 46b and 47b, but each of these chambers has an auxiliary chamber 93 and 94, respectively, overlying the main chamber and arranged coaxially therewith. Liquid oxidizer and fuel may be supplied to the chambers 46b and 47b the same as in either FIGURE 2 or 7. Gas is supplied through lines 95 and 96 to the auxiliary chambers 93 and 94 as controlled by a valve or valves 97 therein. Ports 98 and 99 connect the auxiliary chambers 93 and 94 with the main chambers 46b and 47b and direct gas into the main chambers in a direction to produce rotation of the liquid therein, see FIGURE 10.

The injector device 92 operates in substantially the same way as the device 45 to control the flow of liquids therefrom by varying the centrifugal force, static head and drag acting on the liquid in each chamber by the injection of gas to produce a controlled discharge of liquid in predictable form at varying rates.

Figure 13:
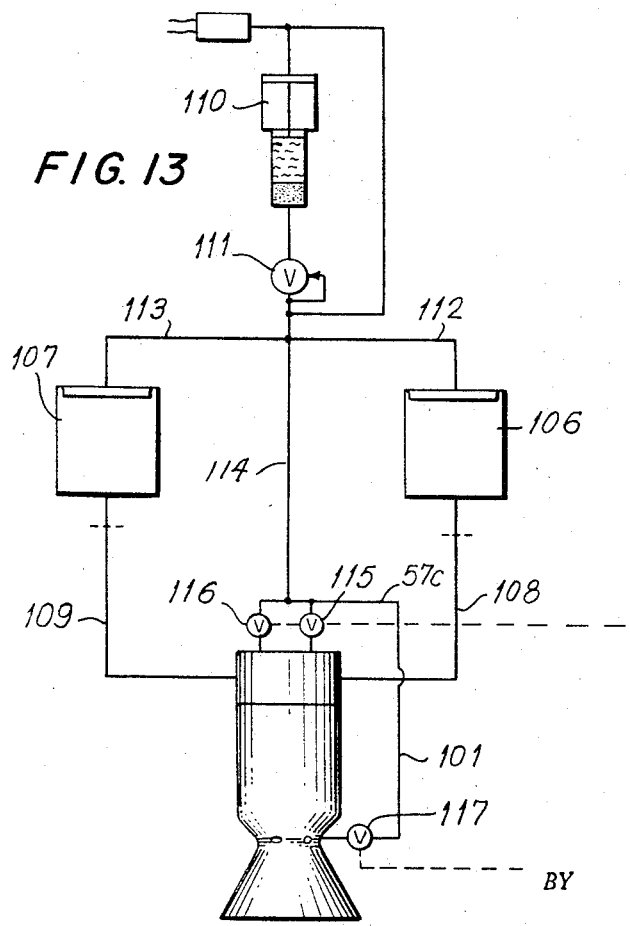
FIGURE 13 is a diagrammatic view of a further modified system for use in a rocket engine.
Figure 12:
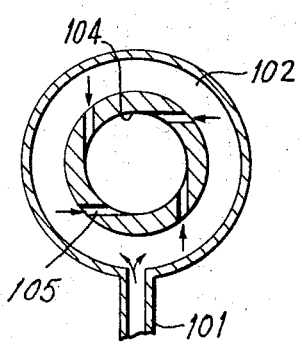
FIGURE 12 is a transverse sectional view taken on line 12—12 of FIGURE 11 to show the tangential fluid inlet ports for producing a vortex of fluid within the nozzle to define a non-structural throat of the required area.

FIGURES 11, 12 and 13 disclose a construction for use in combination with the injectors illustrated in FIGURES 1 to 10 for maintaining a constant pressure in the combustion chamber and thereby simplify the control of liquid fuel and gas supplied to the chambers of the injector. The pressure in the combustion chamber is controlled by injecting gas into the converging portion of the nozzle upstream from its throat to produce a non-structural throat therein. The size of the non-structural throat is varied to maintain a constant chamber pressure which, in turn, will vary the mass flow rate and thrust produced by the engine. Furthermore, the gas is injected into the jet stream tangentially at the periphery of the circular nozzle to produce a vortex of the gas in an annular swirling ring constituting the non-structural throat.

FIGURE 11 diagrammatically illustrates a vessel 100 forming the combustion chamber 9c, the circular injector chambers 46c and 47c at one end and a nozzle 14c at the opposite end in an arrangement generally similar to that illustrated in FIGURE 1. It will be understood that suitable tanks would be provided for supplying oxidizer and fuel through the inlet ports 58c and 59c the same as in the prior constructions. Gas from a gas producer (not shown) is supplied to inlet ports 55c and 56c through a conduit having a control valve 57c. In addition, a branch 101 from the gas supply conduit extends beyond the valve 57c and is connected to an annular chamber 102 surrounding the converging portion 103 of the nozzle upstream from the throat 104. A series of orifices 105 extend from the annular chamber 102 through the wall of the converging section 103 of the nozzle forwardly of the throat 104 to provide outlet ports in the combustion chamber. A flow of gas through the outlet ports 105 around the periphery of the jet stream adjacent the throat 104 will produce a non-structural throat within the structural throat 104 of the nozzle 14c. By increasing the pressure of the gas supplied to the ports 105 the diameter of the non-structural throat may be decreased to increase the pressure in the combustion chamber 9c; and by decreasing the pressure of the gas supplied to the ports 105 the area of the non-structural throat is increased to decrease the pressure in the combustion chamber. If the pressure and amount of gas supplied to the chambers 46c and 47c changes, the amount of oxidizer and fuel supplied to the combustion chamber 9c changes in inverse proportion and tends to change the pressure in the combustion chamber 9c. A corresponding change in the amount of gas supplied through ports 105 occurs which also changes the diameter of the non-structural throat. Thus, the same valve 57c for controlling the flow of gas to the chambers of the injector also serves to control the flow of gas to the ring of outlet ports 105 in the nozzle 104 to maintain a substantially constant pressure while permitting the mass flow rate and thrust to vary for most efficient operation at a desired condition. Fixed orifice plates O and O' in the branch lines to port 56c and 105 may be provided as required.

It will be observed by reference to FIGURE 12 that ports 105 are formed in the wall of the converging part 103 of the nozzle 14c to deliver gas against the wall tangentially to produce a potential vortex in the main gas stream having a pressure gradient from the circumference to the axis and thereby form a non-structural or aerodynamic throat within the structural throat 103.

FIGURE 13 diagrammatically illustrates another modified arrangement of elements in the vehicle, similar to that illustrated in FIGURE 6, for supplying oxidizer and fuel to the jet engine. For example, oxidizer and fuel tanks 106 and 107 are shown for delivering the respective liquids through the lines 108 and 109 to the outlet ports 58c and 59c as shown in FIGURE 11. A gas generator 110 for a monopropellant delivers gas through a pressure regulator 111 and lines 112 and 113 to the tanks 106 and 107 to force the liquid from the tanks into the combustion chamber. Another line 114 supplies the same gas under pressure to the outlet ports 55c and 56c, as explained above, and through the line 101 to the annular chamber 102 illustrated in FIGURES 11 and 12. In this construction, however, valves 115 and 116 control the flow of gas to the ports 55c and 56c in the injector chambers 46c and 47c, respectively, and a valve 117 in the line 101 controls the flow of gas to the outlet ports 104 in the nozzle 14c for forming a non-structural throat. Valves 115, 116 and 117 may be operated simultaneously or individually from a common module to meet the particular requirements.

It will now be observed that the present invention provides an improved method of and apparatus for controlling the rate of flow of fluid by varying the centrifugal force and static head acting on the fluid. It will also be observed that the present invention provides an improved method of and apparatus for modulating the rate of flow of a conical spray of liquid fuel injected into a combustion chamber. It will further be observed that the present invention provides an improved method of and apparatus for controlling the supply of liquid fuel and oxidizer to the combustion chamber of a rocket engine. It will also be observed that the present invention provides an improved combination of elements for simultaneously varying the amount of fuel supplied and the area of a non-structural throat to maintain a substantially constant pressure in the combustion chamber. It will still further be observed that the present invention provides an improved apparatus for injecting liquids into the combustion chamber of a rocket engine which apparatus is of simple and compact construction, economical to manufacture and one which is reliable in operation.

While several embodiments of the injector device are herein illustrated and described, it will be understood that further changes may be made in the construction and arrangement of elements without departing from the spirit or scope of the invention. Therefore, without limitation in this respect, the invention is defined by the following claims.

I claim:
1. The method of controlling the injection of a fluid fuel to the combustion chamber of a rocket engine with the aid of a circular chamber having an axial outlet opening at one side communicating with said combustion chamber which comprises the steps of supplying said fluid substantially tangentially to said circular chamber; supplying an auxiliary fluid having a lower specific gravity than the first fluid to said circular chamber in a direction to impart energy to the first fluid and produce a rotative force in the circular chamber; both of said fluids tending to escape from said circular chamber in concentric areas of the axial outlet opening; the energy imparted to the first fluid controlling its velocity in a circular path and the centrifugal force acting thereon to move it radially away from the outlet opening from the circular chamber; and varying the rate of flow of the second fluid supplied to said circular chamber to vary the energy, centrifugal force and static pressure acting on the first fluid to control the rate at which the first fluid escapes from the outlet opening.

2. A method of controlling the delivery of a fluid in accordance with claim 1 in which the first fluid is a liquid, the second fluid is a gas, and the gas is delivered to said chamber in a direction to rotate the liquid in a circular path in said chamber.

3. A method of controlling the delivery of a fluid in accordance with claim 2 in which the gas is supplied at a rate to produce a centrifugal force and static pressure acting on said liquid greater than the force acting on the liquid to supply it to said chamber, and varying the pressure and rate at which said gas is supplied between maximum and minimum limits to stop and inversely vary the rate of flow of liquid from the chamber.

4. The method of controlling the delivery of a fluid with the aid of a circular chamber having an axial outlet opening at one side which comprises the steps of supplying said fluid to said chamber, supplying an auxiliary fluid having a lower specific gravity than the first fluid to said chamber in a direction to impart energy to the first fluid and produce a rotative force in the chamber, both of said fluids tending to escape from said chamber in concentric areas of the axial outlet opening, the energy imparted to the first fluid controlling its velocity in a circular path and the centrifugal force acting thereon to move it radially away from the outlet opening from the chamber, and varying the rate of flow of the second fluid supplied to said chamber to vary the energy, centrifugal force and static pressure acting on the first fluid to control the rate at which the first fluid escapes from the outlet opening; said first fluid being a liquid, said second fluid being a gas, and said gas being delivered to said chamber in a direction to rotate the liquid in a circular path in said circular chamber; said liquid being a plurality of liquids supplied separately to coaxial circular chambers having outlet openings concentric to the axis of said circular chambers, supplying gas and liquid tangentially to each of said chambers to rotate the liquid therein and discharge concentric sheets of the liquid therefrom at a controlled rate, and directing the concentric sheets of separate liquid in intersecting paths.

5. A method of controlling the delivery of fluids in accordance with claim 4 in which the separate liquids are a fuel and oxidizer for propelling a rocket engine.

6. Apparatus for injecting fuel into a rocket engine combustion chamber at a controlled rate comprising a circular fuel chamber having an axial outlet opening at one side communicating with said combustion chamber, conduit means for supplying liquid fuel to said fuel chamber, means for supplying gas to said fuel chamber under pressure and in a direction to cause the liquid to rotate in said fuel chamber and flow from said axial opening, and valve means for controlling the supply of gas to said fuel chamber to control the rate of discharge of liquid through said outlet from said fuel chamber.

7. Apparatus for injecting liquid fuel in accordance with claim 6 comprising a plurality of coaxial circular chambers each having an outlet opening concentric with the axis of the chambers, means for delivering liquid and gas to each of said chambers to rotate the liquid therein, and the outlet openings from the chambers being shaped to deliver the liquid from the chambers in concentric sheets which intersect each other beyond the outlets to mix the liquids.

8. Apparatus for injecting fuel in accordance with claim 7 in which the outlet from one chamber is a cylindrical hole opening at the axis of the chamber and a diverging conical surface at one side to deliver a conical sheeet of liquid therefrom, the other chamber being of annular shape with an annular outlet opening concentric with the outlet opening from the chamber and spaced radially outward therefrom, the outer edge of the outlet opening from the other chamber over which the liquid escapes being shaped to deliver an annular sheet of the liquid.

9. Apparatus for injecting liquid fuel in accordance with claim 6 in which the gas is supplied to the chamber axially thereof, and spiral vanes for directing the gas in a circular path.

10. Apparatus for injecting liquid fuel in accordance with claim 6 in which said chamber has an auxiliary coaxial chamber, means for supplying the liquid fuel to the main chamber and gas to the auxiliary chamber, and passages between the chambers for directing the gas into the main chamber for movement in a circular path therein.

11. In an apparatus for controlling the injection of fuel into the combustion chamber of a rocket engine, the combination of an injector for delivering liquid fuel to the combustion chamber at varying rates to produce varying mass flow rates and thrust, a nozzle at the outlet end of the combustion chamber having converging and diverging walls forming a throat therebetween, fluid outlet ports in the converging wall of the nozzle located forwardly of the throat for producing a non-structural throat within the structural throat of an area proportional to the amount of fluid supplied, and means for varying the rate at which fluid is supplied to the outlet ports in inverse relation to the rate of fuel flow from the injector into the combustion chamber to maintain a substantially constant pressure in the combustion chamber.

12. An apparatus in accordance with claim 11 in which the injector comprises a circular chamber having an axial outlet opening at one side, conduit means for supplying liquid fuel and control fluid to said circular chamber in a direction to rotate the liquid fuel therein and discharge it through the axial outlet, the fluid supplied to the outlet ports in the converging wall of the nozzle being the same fluid supplied to the circular chamber of the injector, and a valve for controlling the flow of fluid from the same source to both the injector and outlet ports in the nozzle.

13. An apparatus in accordance with claim 12 in which valve means are provided in the fluid supply lines to separately control the flow of fluid to the circular chamber and outlet ports in the nozzle.

14. An apparatus in accordance with claim 11 in which the fluid outlet ports in the nozzle are shaped to inject fluid against the surface of the nozzle wall substantially tangent thereto.

References Cited

UNITED STATES PATENTS

| | | | |
|---|---|---|---|
| 1,381,095 | 6/1921 | Starr | 239—400 |
| 1,462,395 | 7/1923 | Thompson | 239—404 |
| 1,517,598 | 12/1924 | Stevenson | 239—404 |
| 2,807,137 | 9/1957 | Meulien | 239—265.17 |
| 3,030,769 | 4/1962 | Budders | 60—270 |
| 3,128,599 | 4/1964 | Carr | 60—235 |
| 3,169,368 | 2/1965 | Munding | 60—258 |
| 3,293,852 | 12/1966 | Galli | 239—265.17 |
| 3,324,891 | 6/1967 | Rhodes | 137—81.5 |

MARTIN P. SCHWADRON, Primary Examiner.

DOUGLAS HART, Assistant Examiner.

U.S. Cl. X.R.

60—235, 240, 271, 39.74; 137—13, 81.5; 239—404, 265.17